(12) United States Patent
Pham Van et al.

(10) Patent No.: US 11,445,203 B2
(45) Date of Patent: Sep. 13, 2022

(54) SUB-PARTITION INTRA PREDICTION IN VIDEO CODING

(71) Applicant: QUALCOMM Incorporated, San Diego, CA (US)

(72) Inventors: Luong Pham Van, San Diego, CA (US); Geert Van der Auwera, Del Mar, CA (US); Adarsh Krishnan Ramasubramonian, Irvine, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 105 days.

(21) Appl. No.: 16/718,594

(22) Filed: Dec. 18, 2019

(65) Prior Publication Data

US 2020/0221099 A1    Jul. 9, 2020

Related U.S. Application Data

(60) Provisional application No. 62/788,658, filed on Jan. 4, 2019.

(51) Int. Cl.

| | |
|---|---|
| *H04N 19/159* | (2014.01) |
| *H04N 19/176* | (2014.01) |
| *H04N 19/70* | (2014.01) |
| *H04N 19/105* | (2014.01) |
| *H04N 19/119* | (2014.01) |

(52) U.S. Cl.
CPC ......... *H04N 19/159* (2014.11); *H04N 19/105* (2014.11); *H04N 19/119* (2014.11); *H04N 19/176* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2013/0136175 A1* | 5/2013 | Wang | H04N 19/593 |
| | | | 375/240.12 |
| 2018/0295384 A1* | 10/2018 | Son | H04N 19/196 |
| 2019/0273922 A1* | 9/2019 | Lim | H04N 19/157 |
| 2020/0077086 A1* | 3/2020 | Lee | H04N 19/176 |
| 2020/0162737 A1 | 5/2020 | Van Der Auwera et al. | |

(Continued)

OTHER PUBLICATIONS

Bross B., et al., "Versatile Video Coding (Draft 3)", Joint Video Experts Team (JVET) of ITU-T SG 16 WP 3 and ISO/EC JTC 1/SC 29/WG 11, 12th Meeting: Macao, CN, JVET-L1001-V9, Oct. 3-12, 2018, 235 pp.

(Continued)

*Primary Examiner* — Tyler W. Sullivan
(74) *Attorney, Agent, or Firm* — Shumaker & Sieffert, P.A.

(57) ABSTRACT

A video coder is configured to determine a split type of a block of video data from an intra prediction mode associated with a neighboring block. The video coder may determine an intra prediction mode associated with a neighboring block of the current block of video data, determine a split type of the current block of video data based on the intra prediction mode associated with the neighboring block, split the current block of video data into a plurality of sub-partitions based on the determined split type, and code the plurality of sub-partitions.

17 Claims, 16 Drawing Sheets

(56) References Cited

U.S. PATENT DOCUMENTS

| | | | | |
|---|---|---|---|---|
| 2020/0244980 | A1* | 7/2020 | Zhao | H04N 19/119 |
| 2020/0280742 | A1* | 9/2020 | Ramasubramonian | H04N 19/645 |
| 2020/0322601 | A1* | 10/2020 | Ko | H04N 19/70 |
| 2021/0051343 | A1* | 2/2021 | Piao | H04N 19/109 |
| 2021/0136373 | A1* | 5/2021 | De Luxán Hernández et al. | H04N 19/593 |
| 2021/0176492 | A1* | 6/2021 | Kim | H04N 19/46 |
| 2021/0185358 | A1* | 6/2021 | Jung | H04N 19/18 |
| 2021/0289197 | A1* | 9/2021 | Ko | H04N 19/11 |
| 2021/0400264 | A1* | 12/2021 | Zhao | H04N 19/463 |

OTHER PUBLICATIONS

Bross B., et al., "Versatile Video Coding (Draft 7)", Joint Video Experts Team (JVET) of ITU-T SG 16 WP 3 and ISO/EC JTC 1/SC 29/WG 11, JVET-P2001-V9, 16th Meeting: Geneva, CH, Oct. 1 -11, 2019, 490 pages.

Chen J., et al., "Algorithm description for Versatile Video Coding and Test Model 2 (VTM 2)", Joint Video Experts Yeam (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.

Chen J., et al., "Algorithm description for Versatile Video Coding and Test Model 3 (VTM 3)", Joint Video Experts Feam (JVET) of ITU-T SG 16 WP 3 and ISO/IEC JTC 1/SC 29/WG 11, JVET-L1002-v1, 12th Meeting: Macao, CN, Oct. 3-12, 2018, 48 pages.

Chen J., et al., "Algorithm Description of Joint Exploration Test Model 1," 1, JVET Meeting; Oct. 19, 2015-Oct. 21, 2015 Geneva;(The Joint Video Exploration Team of ISO/IEC JTC1/SC29/WG11 and ITU-T SG.16); URL: http://phenix.int-evry.fr/jvet/ No. JVET-A1001 Feb. 24, 2016 (Feb. 24, 2016), XP030150000, 27 pages.

Ergen S., "ZigBee/IEEE 802.15.4 Summary", Sep. 10, 2004, 37 Pages.

Hernández S-D., et al., "CE3: Line-based intra coding mode (Tests 2.1.1 and 2.1.2)", 12th JVET Meeting, Oct. 3, 2018-Oct. 12, 2018, Macao, CN (The Joint Video Exploration Team of ISO/IEC JTC1/SC29/WG11 and ITU-T SG.16), No. JVET-L0076-V2, Fraunhofer HHI, pp. 1-10.

IEEE Computer Society; "Part 11: Wireless LAN Medium Access Control (MAC) and Physical Layer (PHY) Specifications: Amendment 4: Enhancements for Very High Throughput for Operation in Bands below 6 GHz", IEEE Standard for Information technology—Telecommunications and information exchange between systems Local and metropolitan area networks-Specific requirements; Sponsored by LAN/MAN Standards Committee; IEEE Standard 802.11acTM-2013, Published on Dec. 18, 2013, 425 Pages.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.

"ITU-T H.265, Series H: Audiovisual and Multimedia Systems, Infrastructure of audiovisual services—Coding of moving Video, High efficiency video coding," The International Telecommunication Union, Apr. 2015, 634 pp, please consider section 7.4.9.6 on p. 102, section 8.5.3.2.6 on p. 141, section 8 5.3.2.7 on pp. 141-145, and section 8.5.3.2.8 on p. 145.

Zhao L., et al., CE3-related: Unification of Angular Intra Prediction for Square and Non-square Blocks, 12, JVEI Meeting, Oct. 3, 2018-Oct. 12, 2018, Macao, CN (The Joint Video Exploration Team of ISO/IEC JTC1/SC29/WG11 and ITU-T SG.16 ), No. JVET-L0279, Oct. 6, 2018 (Oct. 6, 2018), XP030195082, pp. 1-10, Retrieved from the Internet URL:http://phenix.int-evry.fr/jvet/doc_end_user/documents/12_Macao/wg11/JVET-L0279-v3.zip JVET-L0279-v1.docx [retrieved on Oct. 6, 2018] cited in the application the whole document.

* cited by examiner

Table I

| predModeIntra | -14^A | -13 | -12^A | -11 |
|---|---|---|---|---|
| intraPredAngle | 512^A | 341 | 256^A | 171 |

| predModeIntra | -10^A | -9 | -8 | -7 | -6^A | -5 | -4 | -3 | -2 | -1 | 2* | 3 | 4 | 5 | 6 | 7^A | 8^A |
|---|---|---|---|---|---|---|---|---|---|---|---|---|---|---|---|---|---|
| intraPredAngle | 128^A | 102 | 86 | 73 | 64^A | 57 | 51 | 45 | 39 | 35 | 32* | 29 | 26 | 23 | 20 | 18 | 16^A |

| predModeIntra | 9 | 10 | 11 | 12^A | 13 | 14^A | 15 | 16^A | 17 | 18# | 19 | 20^A | 21 | 22^A | 23 | 24^A | 25 |
|---|---|---|---|---|---|---|---|---|---|---|---|---|---|---|---|---|---|
| intraPredAngle | 14 | 12 | 10 | 8^A | 6 | 4^A | 3 | 2^A | 1 | 0# | -1 | -2^A | -3 | -4^A | -6 | -8^A | -10 |

| predModeIntra | 26 | 27 | 28^A | 29 | 30 | 31 | 32 | 33 | 34* | 35 | 36 | 37 | 38 | 39 | 40 | 41 | 42 |
|---|---|---|---|---|---|---|---|---|---|---|---|---|---|---|---|---|---|
| intraPredAngle | -12 | -14 | -16^A | -18 | -20 | -23 | -26 | -29 | -32* | -29 | -26 | -23 | -20 | -18 | -16 | -14 | -12 |

| predModeIntra | 43 | 44^A | 45 | 46^A | 47 | 48^A | 49 | 50# | 51 | 52^A | 53 | 54^A | 55 | 56^A | 57 | 58 | 59 |
|---|---|---|---|---|---|---|---|---|---|---|---|---|---|---|---|---|---|
| intraPredAngle | -10 | -8^A | -6 | -4^A | -3 | -2^A | -1 | 0# | 1 | 2^A | 3 | 4^A | 6 | 8^A | 10 | 12 | 14 |

| predModeIntra | 60^A | 61 | 62 | 63 | 64 | 65 | 66* | 67 | 68 | 69 | 70 | 71 | 72^A | 73 | 74 | 75 | 76^A |
|---|---|---|---|---|---|---|---|---|---|---|---|---|---|---|---|---|---|
| intraPredAngle | 16^A | 18 | 20 | 23 | 26 | 29 | 32* | 35 | 39 | 45 | 51 | 57 | 64^A | 73 | 86 | 102 | 128^A |

| predModeIntra | 77 | 78^A | 79 | 80^A |
|---|---|---|---|---|
| intraPredAngle | 171 | 256^A | 341 | 512^A |

FIG. 9

SUB-PARTITION INTRA PREDICTION IN VIDEO CODING

This application claims the benefit of U.S. Provisional Application No. 62/788,658, filed Jan. 4, 2019, the entire content of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, smart phones, video teleconferencing devices, video streaming devices, and the like. Digital video devices implement video compression techniques, such as those described in the standards defined by ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including 'its Scalable Video Coding (SVC) and Multiview Video Coding (MVC) extensions and ITU-T H.265 (also known as ISO/IEC MPEG-4 HEVC) with its extensions, MPEG-2, MPEG-4, ITU-T H.263, ITU-T H.264/MPEG-4, Part 10, Advanced Video Coding (AVC), the High Efficiency Video Coding (HEVC) standard, and extensions of such standards. The state-of-the-art video coding standard, namely HEVC, was finalized by the Joint Collaboration Team on Video Coding (JCT-VC) of ITU-T Video Coding Experts Group (VCEG) and ISO/IEC Motion Picture Experts Group (MPEG) in April 2013.

During the April 2018 meeting of the Joint Video Experts Team (JVET), a collaborative team formed by MPEG and ITU-T Study Group 16's VCEG has recently been working on a new video coding standard to be known as the Versatile Video Coding (VVC). The VVC standardization activity (also known as ITU-T H.266) commenced during the April 2018 meeting, with the evaluation of the video compression technologies submitted in response to the Call for Proposals. The primary objective of VVC is to provide a significant improvement in compression performance over the existing HEVC standard, aiding in deployment of higher-quality video services and emerging applications such as 360° omnidirectional immersive multimedia and high-dynamic-range (HDR) video. The development of the VVC standard is expected to be completed in 2020.

The video devices may transmit, receive, encode, decode, and/or store digital video information more efficiently by implementing such video compression techniques. Video compression techniques may perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, such as coding tree blocks and coding blocks. Spatial or temporal prediction results in a predictor block for a block to be coded. Residual data represents pixel differences between the original block to be coded and the predictor block. For further compression, the residual data may be transformed from the pixel domain to a transform domain, resulting in residual transform coefficients, which then may be quantized.

SUMMARY

A video coder (e.g., a video encoder or a video decoder) may use intra prediction to generate a prediction block for a current block of a current picture. In general, when using intra prediction to generate the prediction block, the video coder determines a set of reference samples in a column left of the current block in the current picture and/or in a row above the current block in the current picture. The video coder may then use the reference samples to determine the prediction block. In some examples, the prediction samples in the predication block may be interpolated from the reference samples. In other examples, the prediction samples in the prediction block may be equal to the reference samples.

This disclosure describes techniques and system configurations that may improve sub-partition or sub-block intra prediction. In particular, various techniques and devices of this disclosure describe techniques that may be used for intra blocks with sub-block and/or sub-partition prediction. In one example, the techniques and devices of this disclosure address potential issues with blocks coded using an intra sub-partition (ISP) coding mode. In ISP coding mode, a block of video data is split into sub-partitions and each of the sub-partitions is coded using intra prediction. In one example of the disclosure, a splitting type for an ISP block (e.g., a horizontal or vertical splitting type) is determined based on an intra prediction mode of a neighboring block. In this way, coding a split type flag may be avoided, thus reducing signaling overhead and increasing coding efficiency. The techniques and devices of this disclosure may be used with the developing Versatile Video Coding (VVC) standard and/or other future standards.

In one example, this disclosure describes an apparatus configured to code video data, the apparatus comprising a memory configured to store a current block of video data, and one or more processors, implemented in circuitry, and in communication with the memory. The one or more processors are configured to determine an intra prediction mode associated with a neighboring block of the current block of video data, determine a split type of the current block of video data based on the intra prediction mode associated with the neighboring block, split the current block of video data into a plurality of sub-partitions based on the determined split type, and code the plurality of sub-partitions.

In another example, this disclosure describes a method of coding video data, the method comprising determining an intra prediction mode associated with a neighboring block of a current block of video data, determining a split type of the current block of video data based on the intra prediction mode associated with the neighboring block, splitting the current block of video data into a plurality of sub-partitions based on the determined split type, and coding the plurality of sub-partitions.

In another example, this disclosure describes a non-transitory computer-readable storage medium storing instructions that, when executed, cause one or more processors of a device configured to code video data to determine an intra prediction mode associated with a neighboring block of the current block of video data, determine a split type of the current block of video data based on the intra prediction mode associated with the neighboring block, split the current block of video data into a plurality of sub-partitions based on the determined split type, and code the plurality of sub-partitions.

In another example, this disclosure describes an apparatus configured to code video data, the apparatus comprising means for determining an intra prediction mode associated with a neighboring block of a current block of video data, means for determining a split type of the current block of video data based on the intra prediction mode associated with the neighboring block, means for splitting the current block of video data into a plurality of sub-partitions based on the determined split type, and means for coding the plurality of sub-partitions.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 9 is a table illustrating the relationship between intra prediction mode and intra prediction angle.

DETAILED DESCRIPTION

Figure 1:
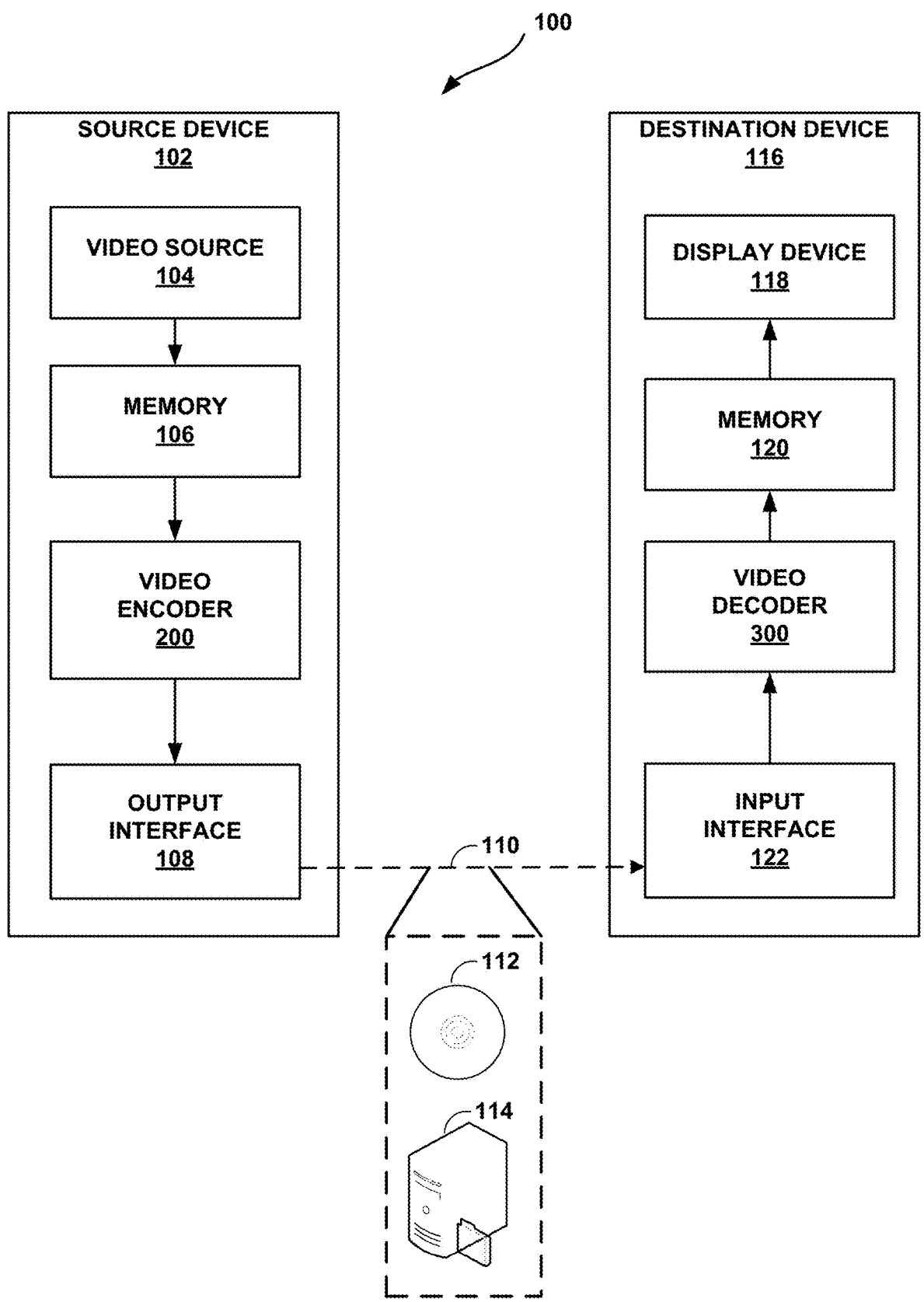
FIG. 1 is a block diagram illustrating an example video encoding and decoding system that may perform one or more techniques described in this disclosure.

FIG. 1 is a block diagram illustrating an example video encoding and decoding system 100 that may perform the techniques of this disclosure for determining a splitting type of a block of video data to be coded using intra prediction. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for determining a splitting type of a block of video data to be coded using intra prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for determining a splitting type of a block of video data to be coded using intra prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memory 106 and memory 120 may store raw video data, e.g., raw video from video source 104 and raw, decoded video data from video decoder 300. Additionally or alternatively, memory 106 and memory 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memory 106 and memory 120 may store encoded video data, e.g., output from video encoder 200 and input to video decoder 300. In some examples, portions of memory 106 and memory 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), encoding of digital video onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 7)," Joint Video Experts Team (WET) of ITU-T SG 16 WP 3 and ISO/IEC JTC 1/SC 29/WG 11, 16$^{th}$ Meeting: Geneva, CH, 1-11 Oct. 2019, JVET-P2001-v9 (hereinafter "VVC Draft 7"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

As will be explained in more detail below, video encoder 200 and video decoder 300 may be configured a splitting type (e.g., vertical or horizontal) for splitting a block of video data that is to be coded using intra prediction. For example, video encoder 200 and video decoder 300 may be configured to determine an intra prediction mode associated with a neighboring block of the current block of video data, determine a split type of the current block of video data based on the intra prediction mode associated with the neighboring block, split the current block of video data into a plurality of sub-partitions based on the determined split type, and code the plurality of sub-partitions.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Inter-Intra Prediction in VVC

An inter-intra prediction coding mode, that improves the merge mode by combining one intra prediction and one merge indexed prediction, was adopted into VVC. In one example when coding a block using inter-intra prediction, video encoder 200 may evaluate candidates in a set of four intra modes (including planar, DC, horizontal, and vertical coding modes) to determine an optimal intra mode to combine with a merge indexed prediction (e.g., an inter prediction). In some example combining processes, if planar or DC mode is selected, or the size of the block is smaller than 4, video encoder 200 and video decoder 300 may use equal weights to combine the inter predicted samples and the intra predicted samples. Otherwise, the weights for intra and inter predicted samples (wIntra, wInter) are different based on the region of the samples within the coding block.

In other examples when coding a block using inter-intra prediction, video encoder 200 may obtain the intra prediction using planar mode to combine with a merge indexed prediction (e.g., an inter prediction). In the combining process, the weights for intra and inter predicted samples (wIntra, wInter) may be different based on the number of neighboring intra coded blocks.

Intra Sub-Partitions Coding Mode

An intra sub-partition (ISP) coding mode was been proposed in S. De Luxán Hernandez, H. Schwarz, D. Marpe, T. Wiegand (HHI) "CE3: Line-based intra coding mode," (hereinafter, "NET-L0076"). When coding video data using the ISP coding mode, video encoder 200 and video decoder 300 may be configured to divide (e.g., split or partition) luma intra-predicted blocks vertically or horizontally into two (2) or four (4) sub-partitions depending on the block size dimensions. Examples of block splitting in the ISP coding mode are described below with respect to FIG. 2 and FIG. 3.

Figure 2:
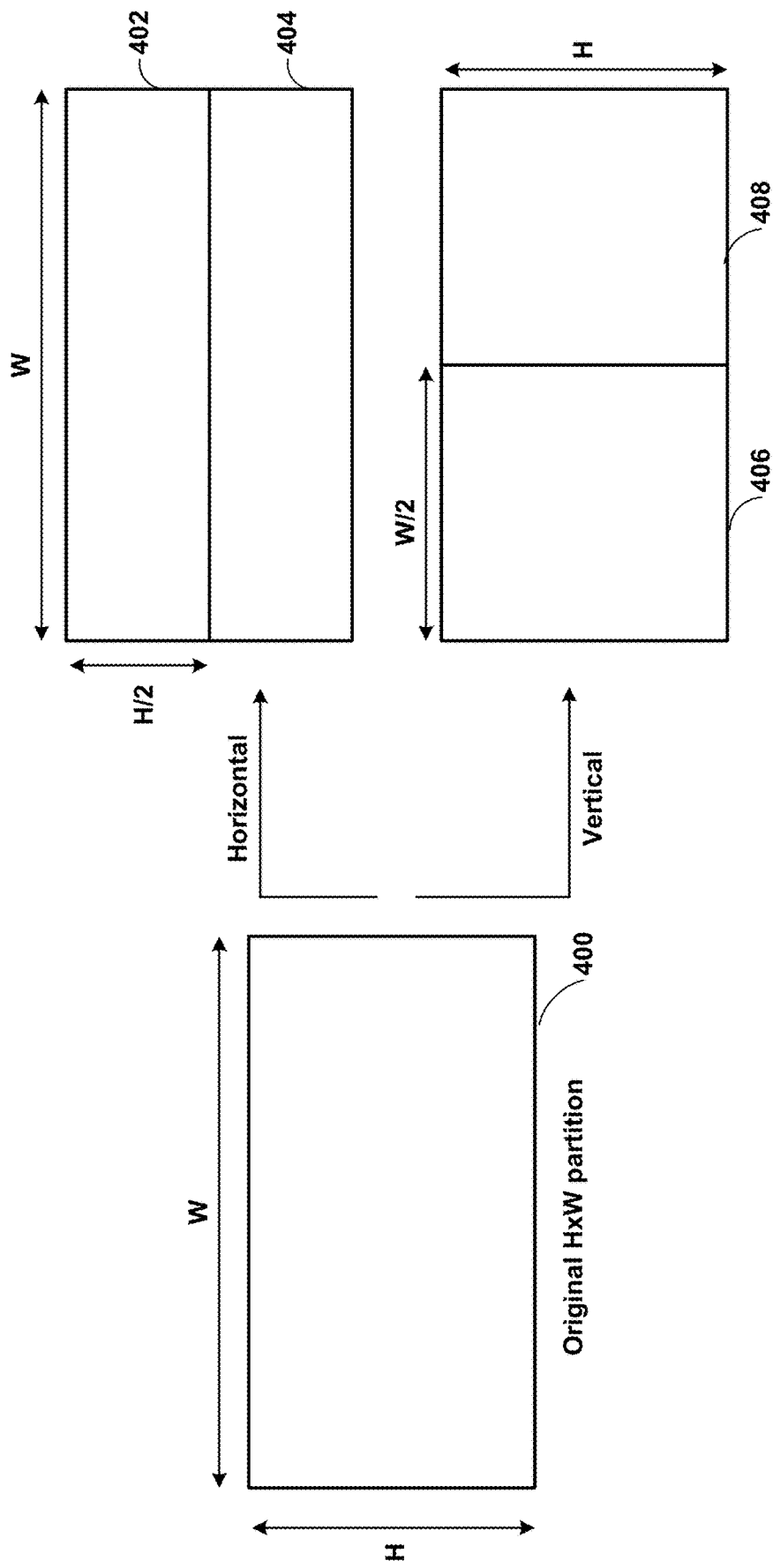
FIG. 2 is a conceptual diagram illustrating example vertical and horizontal divisions of a block.

FIG. 2 is a conceptual diagram illustrating example vertical and horizontal divisions of a block. As shown in FIG. 2, current block 400 is an ISP block. That is, block 400 is a block that is to be split into sub-partitions, and each of the sub-partitions are to be coded using intra prediction. Current block 400 has a height (H) and a width. In the ISP coding mode, video encoder 200 and/or video decoder 300 may be configured to split current block 400 either horizontally or vertically. In the example of FIG. 2, video encoder 200 and/or video decoder 300 may be configured to split current block 400 into two sub-partitions. When using a horizontal split type, video encoder 200 and/or video decoder 300 may split current block 400 into sub-partition 402 and sub-partition 404. Each of sub-partition 402 and sub-partition 404 have a height equal to H/2 and a width equal to W. When using a vertical split type, video encoder 200 and/or video decoder 300 may split current block 400 into sub-partition 406 and sub-partition 408. Each of sub-partition 406 and sub-partition 408 have a height equal to H and a width equal to W/2.

Figure 3:
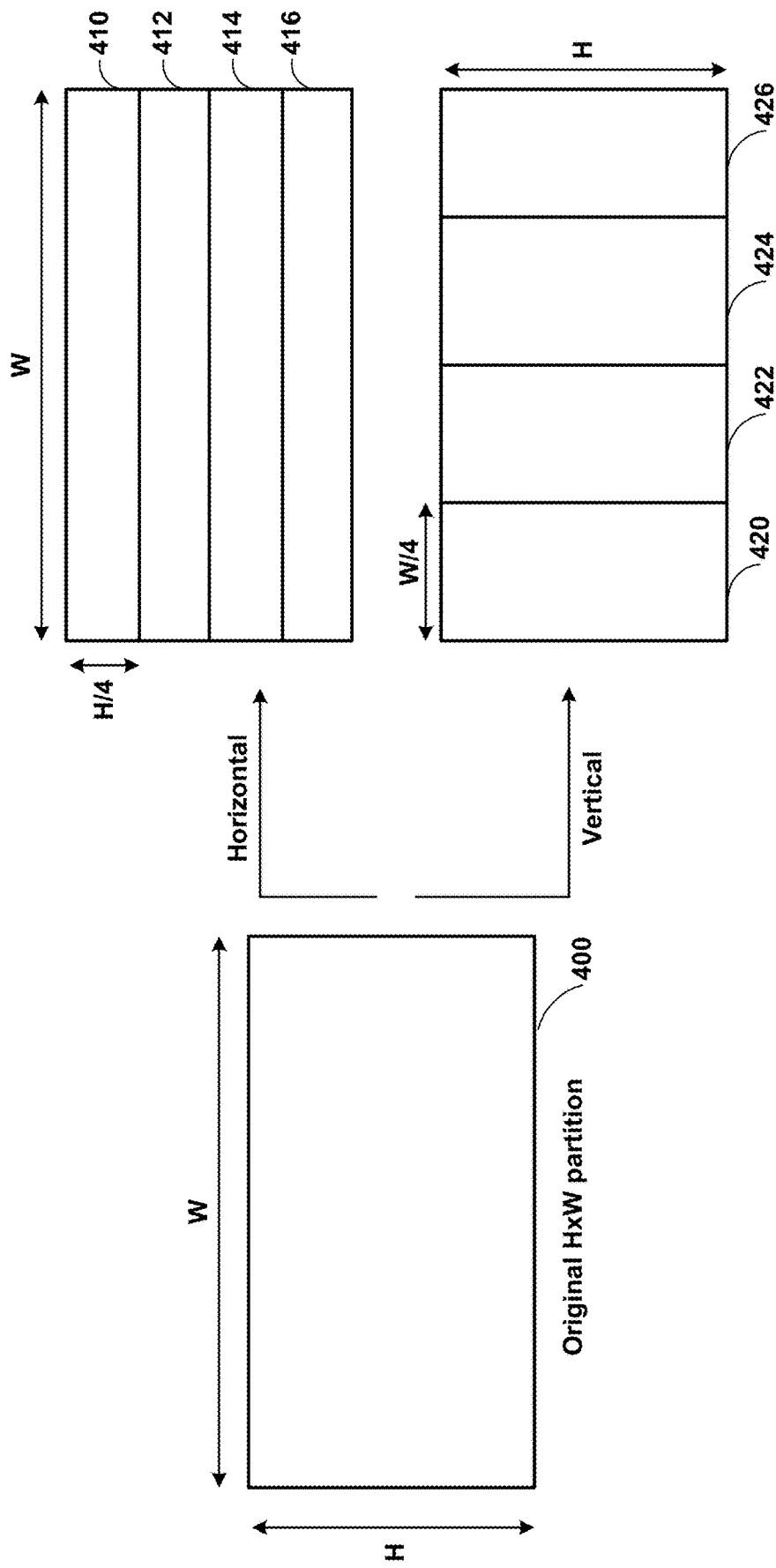
FIG. 3 is a conceptual diagram illustrating other examples of vertical and horizontal divisions of a block.

FIG. 3 is a conceptual diagram illustrating other examples of vertical and horizontal divisions of a block. FIG. 3 again shows current block 400, which is an ISP block. In this example, video encoder 200 and/or video decoder 300 may split current block 400 into four sub-partitions. When using a horizontal split type, video encoder 200 and/or video decoder 300 may split current block 400 into sub-partition 410, sub-partition 412, sub-partition 414, and sub-partition 416. Each of sub-partition 410, sub-partition 412, sub-partition 414, and sub-partition 416 have height equal to H/4 and a width equal to W. When using a vertical split type, video encoder 200 and/or video decoder 300 may split current block 400 into sub-partition 420, sub-partition 422, sub-partition 424, and sub-partition 426. Each of sub-partition 420, sub-partition 422, sub-partition 424, and sub-partition 426 have a height equal to H and a width equal to W/4.

FIG. 2 and FIG. 3 are merely example split types. In other examples of ISP, a current block may be split into any number of partitions (e.g., 3, 5, 6, etc.). In addition, in some examples, the sizes of the sub-partitions need not be symmetrical. That is, the sub-partitions may have different sizes.

In one example, based on the intra coding mode and split type utilized, two different classes of processing orders may be used, which are referred to as "normal" order and "reversed" order. In the normal order, the first sub-partition to be processed is the sub-partition containing the top-left sample of the CU, and then continuing downwards (horizontal split) or rightwards (vertical split). Video encoder 200 may signal a bit that indicates the splitting type (e.g., horizontal or vertical split) of the CU to video decoder 300. In another example, the reverse processing order either starts with the sub-partition containing the bottom-left sample of the CU and continues upwards, or starts with the sub-partition containing the top-right sample of the CU and continues leftwards.

Intra Prediction

Figure 4:
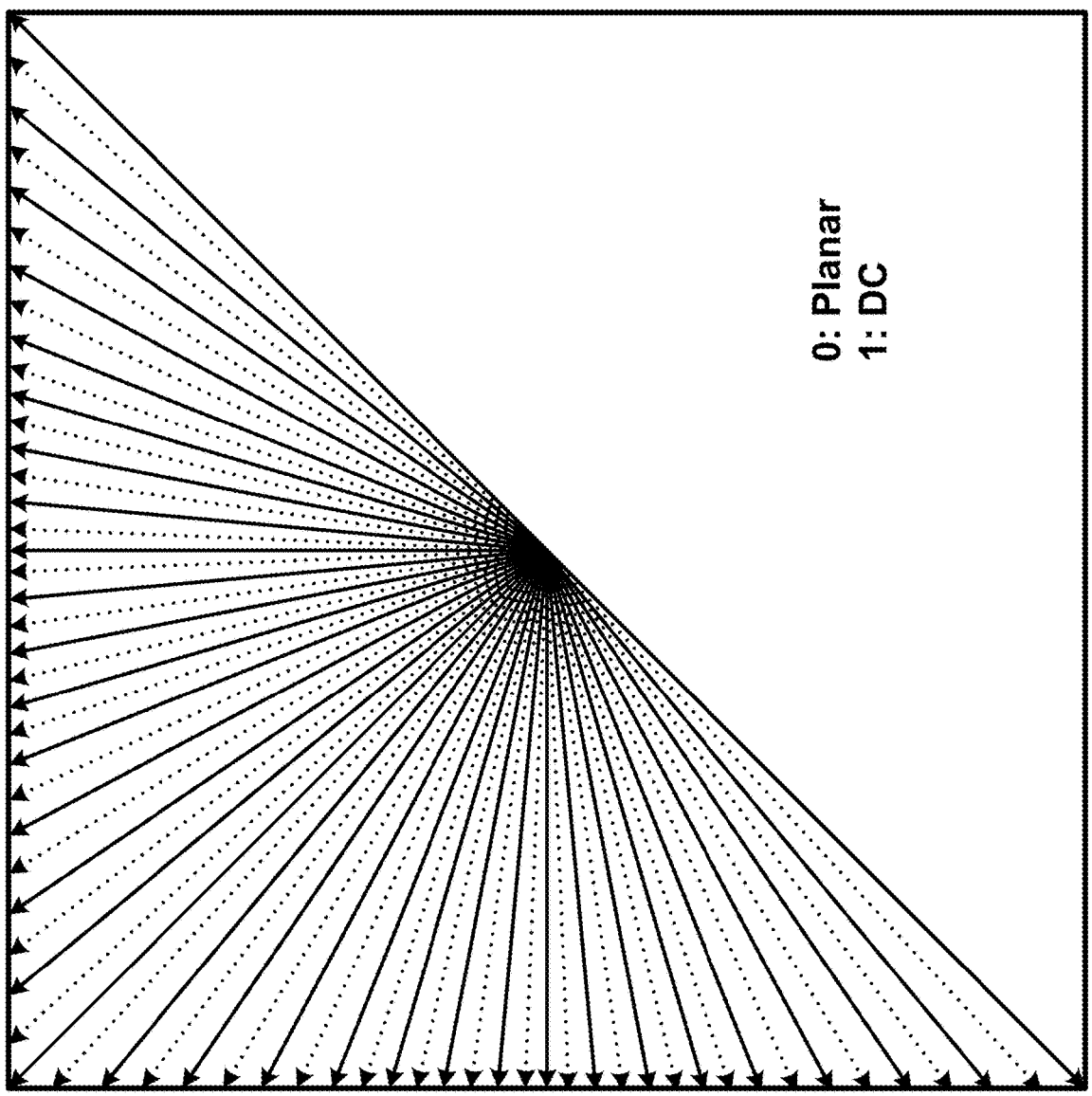
FIG. 4 is a conceptual diagram illustrating example intra prediction directions.

For the luma component, video encoder 200 and video decoder 300 may perform intra prediction using DC, Planar, and a plurality of directional (or angular) prediction modes. In J. Chen, Y. Ye, S. Kim, "Algorithm description for Versatile Video Coding and Test Model 2 (VTM2)," 11th JVET Meeting, Ljubljana, SI, July 2018, JVET-K1002, angular intra prediction for square blocks uses prediction directions between −135 degrees and 45 degrees relative to a current block, as is depicted in FIG. 4. Intra prediction modes also include a DC prediction mode and a Planar prediction mode in addition to the directional (or angular) prediction modes shown in FIG. 4.

In VTM2, the block structure used for specifying the prediction block for intra prediction is not restricted to be square (width w=height h). Rectangular or non-square prediction blocks (w>h or w<h) can increase the coding efficiency based on the characteristics of the video content.

In such rectangular blocks, restricting the direction of intra prediction to be within −135 degrees to 45 degrees may result in situations where farther reference samples are used for intra prediction rather than closer reference samples. Such a design may have an impact on coding efficiency. Thus, it may be beneficial to change the range of angle restrictions so that closer reference samples (beyond the −135 to 45 degree angle) may be used for prediction. An example of such a case is shown in FIG. 5.

Figure 5:
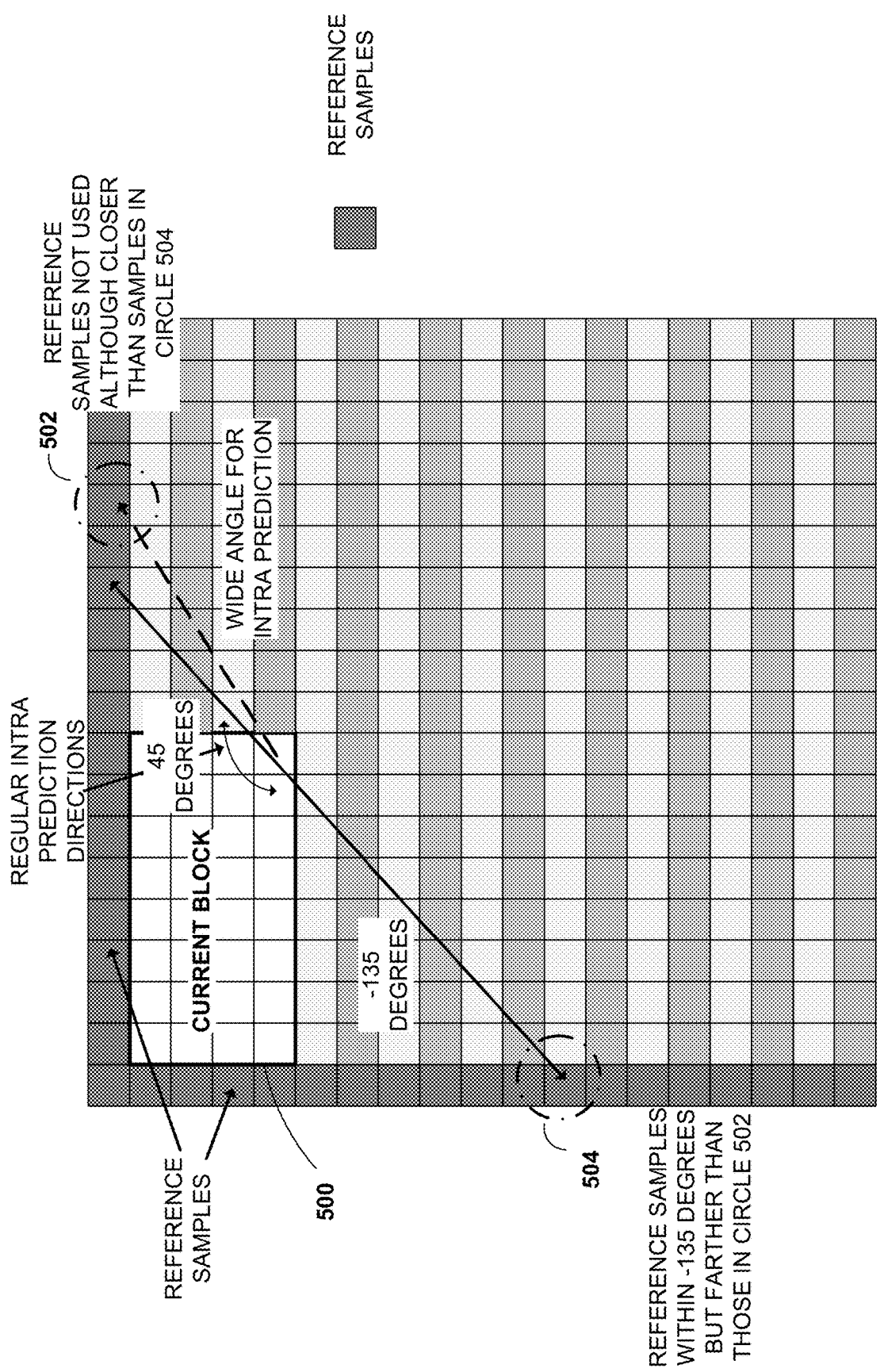
FIG. 5 is a conceptual diagram illustrating example reference samples of wide angle intra prediction.

FIG. 5 shows an example of a 4×8 rectangular current block 500 where "closer" reference samples (circle 502) are not used, but farther reference samples (circle 504) may be used, due to a restriction of the intra prediction directions to be in the range of −135 degrees to 45 degrees.

During the 12th JVET meeting, a modification of wide-angle intra prediction was proposed in L. Zhao, X. Zhao, S. Liu, X. Li, "CE3-related: Unification of angular intra prediction for square and non-square blocks," 12th JVET Meeting, Macau SAR, C N, October 2018, JVET-L0279 and was adopted into VTM3. VTM3 is described in J. Chen, Y. Ye, S. Kim, "Algorithm description for Versatile Video Coding and Test Model 3 (VTM3)," 12th JVET Meeting, Macau SAR, CN, October 2018, JVET-L1002.

Figure 6A:
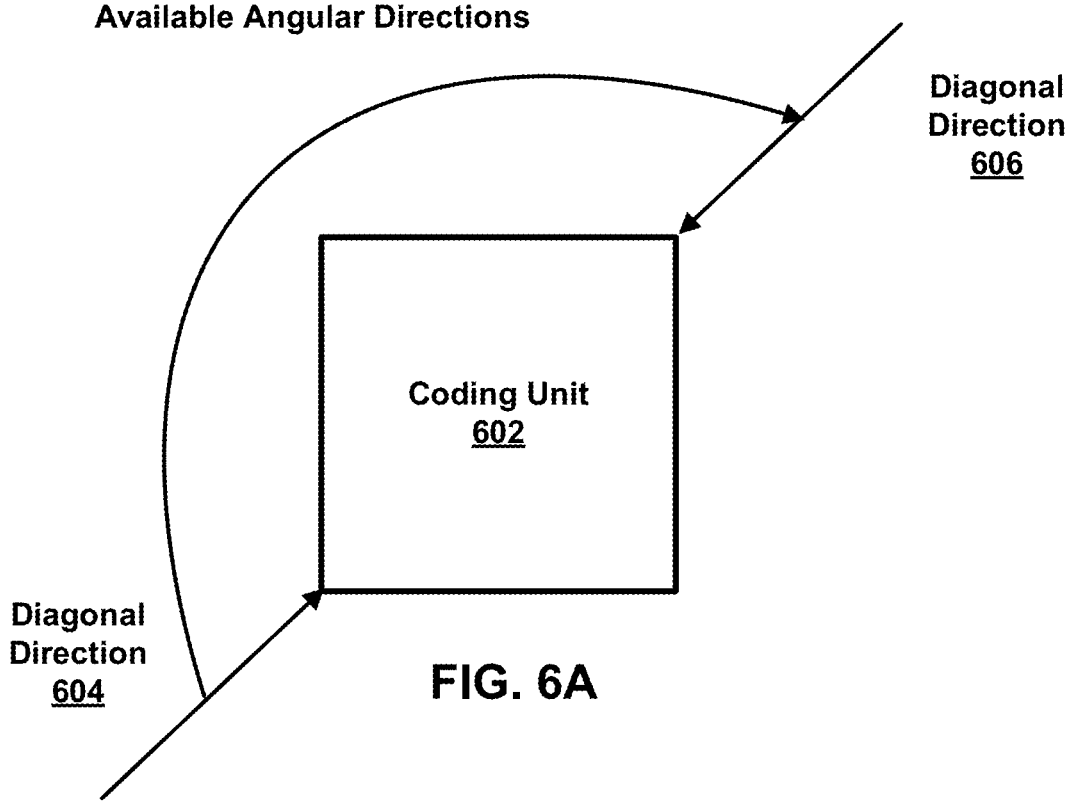
FIGS. 6A-6C are conceptual diagrams illustrating mode mapping for coding units with different shapes.
Figure 6B:
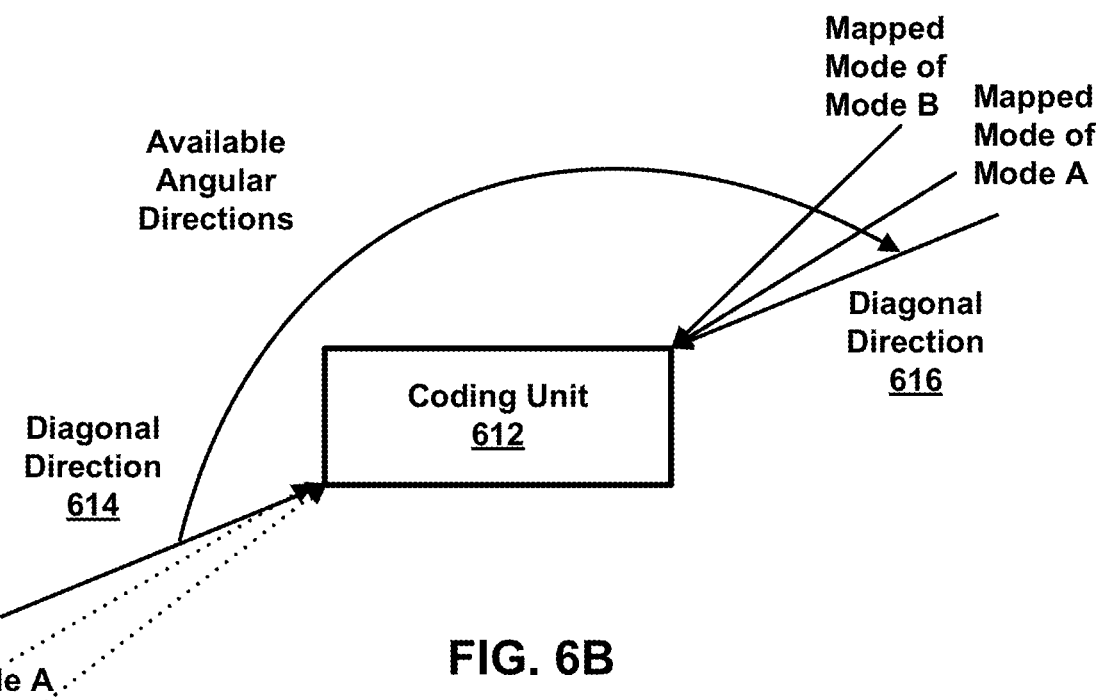
Figure 6C:
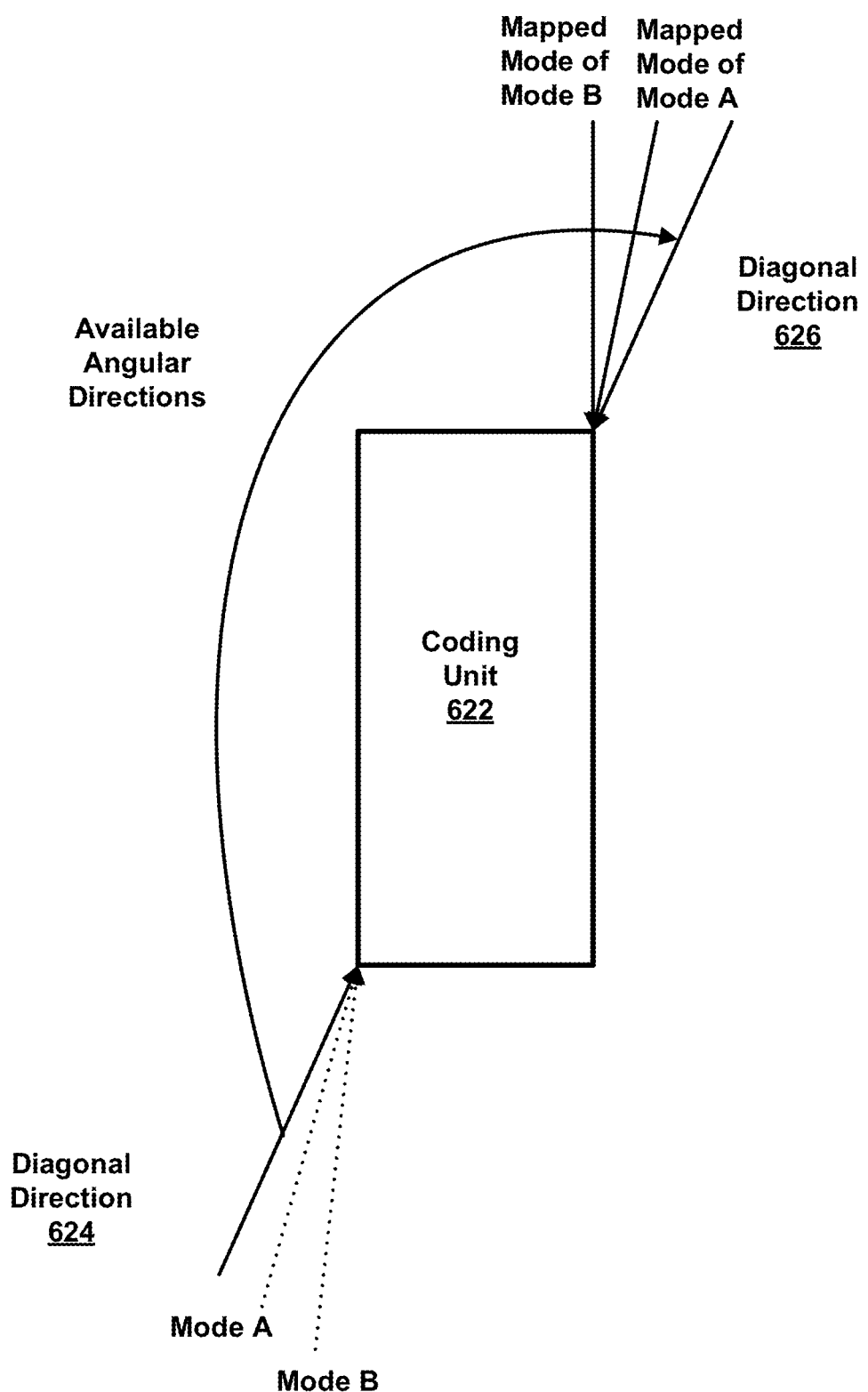

This proposal included two modifications to unify the angular intra prediction for square and non-square blocks. First, angular prediction directions were modified to cover diagonal directions of all block shapes. Secondly, all angular directions were kept within the range between the bottom-left diagonal direction and the top-right diagonal direction for all block aspect ratios (square and non-square) as illustrated in FIGS. 6A-6C. In addition, the number of reference samples in the top reference row and left reference column can be restricted to 2*width+1 and 2*height+1 for all block shapes.

FIGS. 6A-6C are conceptual diagram illustrating mode mapping for coding units with different shapes. Video encoder 200 and video decoder 300 may implement a mode mapping process to determine the available intra-prediction modes for various shapes and sized of CUs. FIG. 6A shows a square block that does not require angular mode remapping. FIG. 6B shows an angular mode remapping for a horizontal non-square block. FIG. 6C shows an angular mode remapping for a vertical non-square block. In FIGS. 6B and 6C, modes A and B are replaced by mapped modes A and B, such that there are still only 65 available angular modes, but those 65 available modes are different between FIG. 6A, FIG. 6B, and FIG. 6C.

In the example of FIG. 6A, CU 602 is a square block (i.e., w=h). Diagonal direction 604 corresponds to a 45 degree prediction angle, and diagonal direction 606 corresponds to a −135 degree prediction angle. All available prediction modes for CU 602 are between diagonal direction 604 and diagonal direction 606, and thus, no mode remapping is needed.

In the example of FIG. 6B, CU 612 is a non-square, rectangular block, where w is greater than h. Diagonal direction 614 represents the diagonal direction running from the bottom-left corner of CU 612 to the top-right corner of CU 612, and diagonal direction 616 represents the diagonal direction running from the top-right corner of CU 612 to the bottom-left corner of CU 612. As modes A and B are not between diagonal directions 614 and 616, modes A and B are replaced by mapped modes A and B, such that all available prediction modes for CU 612 are between diagonal direction 614 and diagonal direction 616.

In the example of FIG. 6C, CU 622 is a non-square, rectangular block, where h is greater than w. Diagonal direction 624 represents the diagonal direction running from the bottom-left corner of CU 622 to the top-right corner of CU 622, and diagonal direction 626 represents the diagonal direction running from the top-right corner of CU 622 to the bottom-left corner of CU 622. As modes A and B are not between diagonal directions 624 and 626, modes A and B are replaced by mapped modes A and B, such that all available prediction modes for CU 622 are between diagonal direction 624 and diagonal direction 626.

Figure 7:
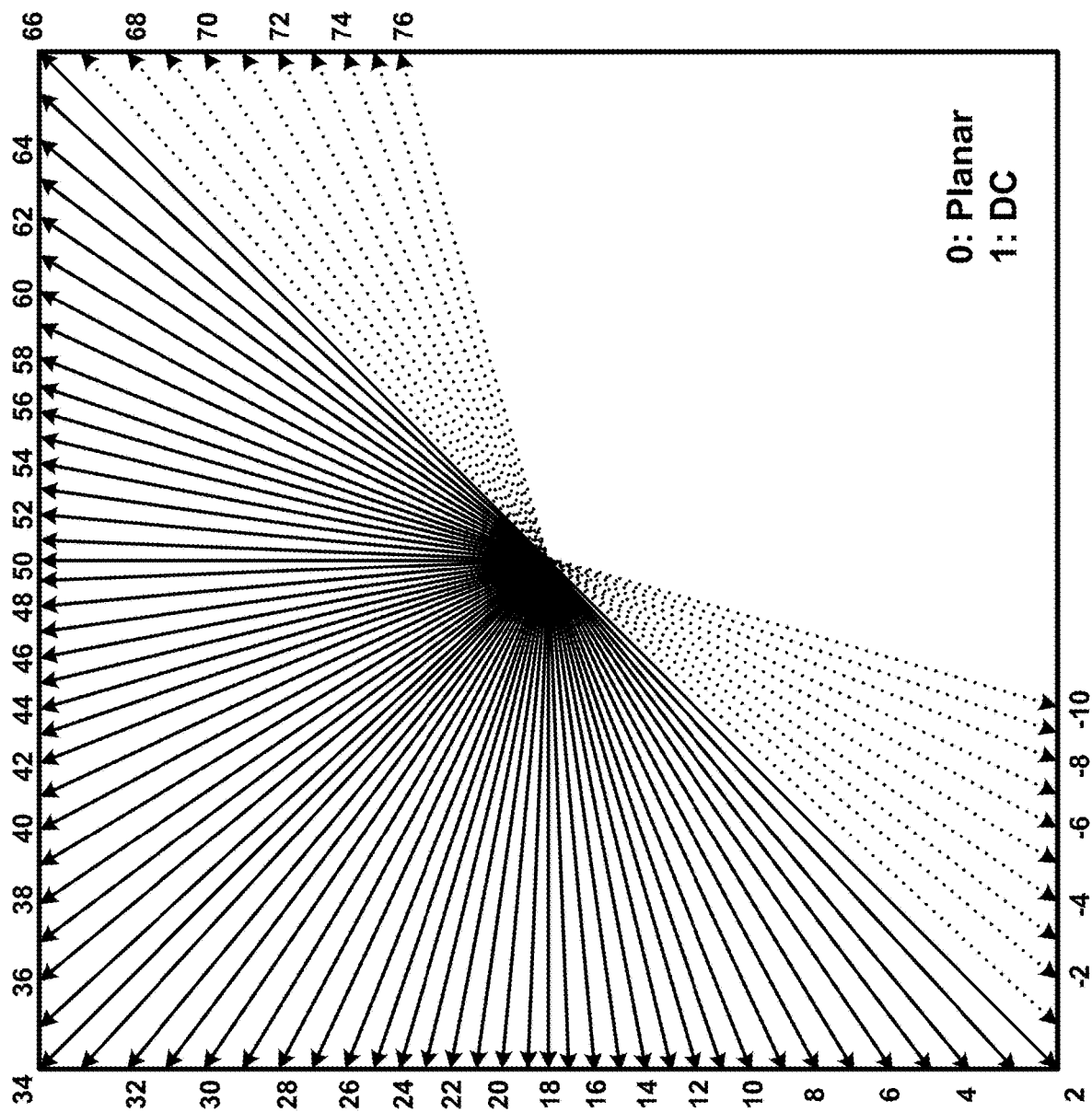
FIG. 7 is a conceptual diagram illustrating example intra prediction directions with wide angle directions.

FIG. 7 is an illustration of wide angles that are adopted in VTM2. FIG. 7 shows wide-angle modes (labeled −1 to −10 and 67 to 76 in FIG. 7) depicted in addition to the 65 angular modes. In the example of FIG. 7, mode 50 corresponds to a prediction angle of −90 degrees. Mode 66 corresponds to a prediction angle of −135 degrees, and mode 2 corresponds to a prediction angle of 45 degrees.

Figure 8:
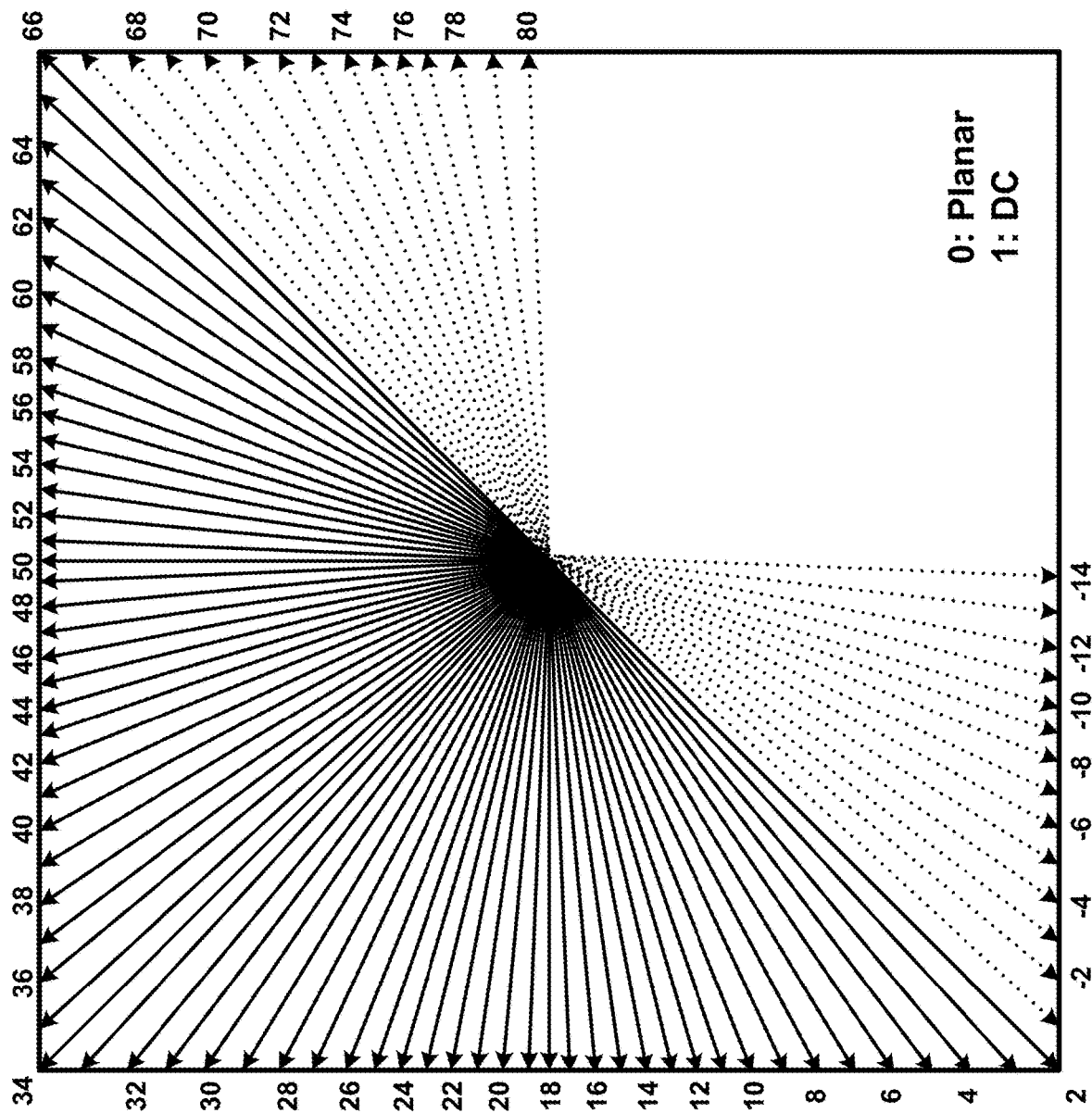
FIG. 8 is a conceptual diagram illustrating another example of intra prediction directions with wide angle directions.

FIG. 8 shows an example of wide angles (labeled −1 to −14 and 67 to 80 in FIG. 8) in VTM3 beyond modes 2 and 66 for a total of 93 angular modes. In the example of FIG. 8, mode 50 corresponds to a prediction angle of −90 degrees.

Mode 66 corresponds to a prediction angle of −135 degrees, and mode 2 corresponds to a prediction angle of 45 degrees. Although VTM3 defines 95 modes, for any block size only 67 modes are allowed. The exact modes that are allowed depend on the block width and height ratio. This is achieved by restricting the mode range based on block size.

FIG. 9 is a table showing the relationship between intra prediction mode and intra prediction angle. In particular, Table I in FIG. 9 specifies the mapping table between the intra prediction mode predModeIntra and the angle parameter intraPredAngle in VTM3. VTM3 is described in B. Bross, J. Chen, S. Liu, "Versatile Video Coding (Draft 3)," 12$^{th}$ JVET Meeting, Macau SAR, C N, October 2018, JVET-L100.

In Table 1, the angular modes corresponding with non-square block diagonals are shown with a caret symbol (∧). The vertical and horizontal modes are shown with a pound sign (#) for reference. Square block diagonal modes are shown in Table 1 with an asterisk (*). In the following, angular modes with a positive intraPredAngle value are referred to as positive angular modes (mode index <18 or >50), while angular modes with a negative intraPredAngle value are referred to as negative angular modes (mode index >18 and <50).

Potential drawbacks may exist in the inter-intra prediction mode and ISP mode described above. In particular, the coding efficiency of the above-described inter-intra prediction mode and ISP mode may be limited, as each mode described is not configured to use coding information of neighboring blocks to improve coding performance of these tools. This disclosure describes one or more techniques to improve the performance of video coders (e.g., video encoder 200 and/or video decoder 300) when coding video data using an inter-intra coding mode or an ISP coding mode.

Inter-Intra Prediction for Bi-Predicted Blocks

In one example of the disclosure, video encoder 200 and video decoder 300 may be configured to perform the inter-intra prediction blending scheme described in co-pending U.S. patent application Ser. No. 16/684,379, filed Nov. 14, 2019. For example, video encoder 200 and video decoder 300 may be configured to use a position-dependent prediction combination (PDPC) scheme to blend the above and left samples, inter predicted samples, and intra prediction samples using an adaptive weight configuration. In another example, video encoder 200 and video decoder 300 may be configured to use a blending scheme without PDPC, in which only intra and inter predictions are blended without the above and left samples. According to one aspect of this disclosure, video encoder 200 and video decoder 300 may be configured to use a more adaptive weighted scheme by using the prediction information of the merge indexed block that is used to combine with the intra prediction. For example, the prediction information may be the number of predictions that are used to generate the inter prediction.

Figure 10:
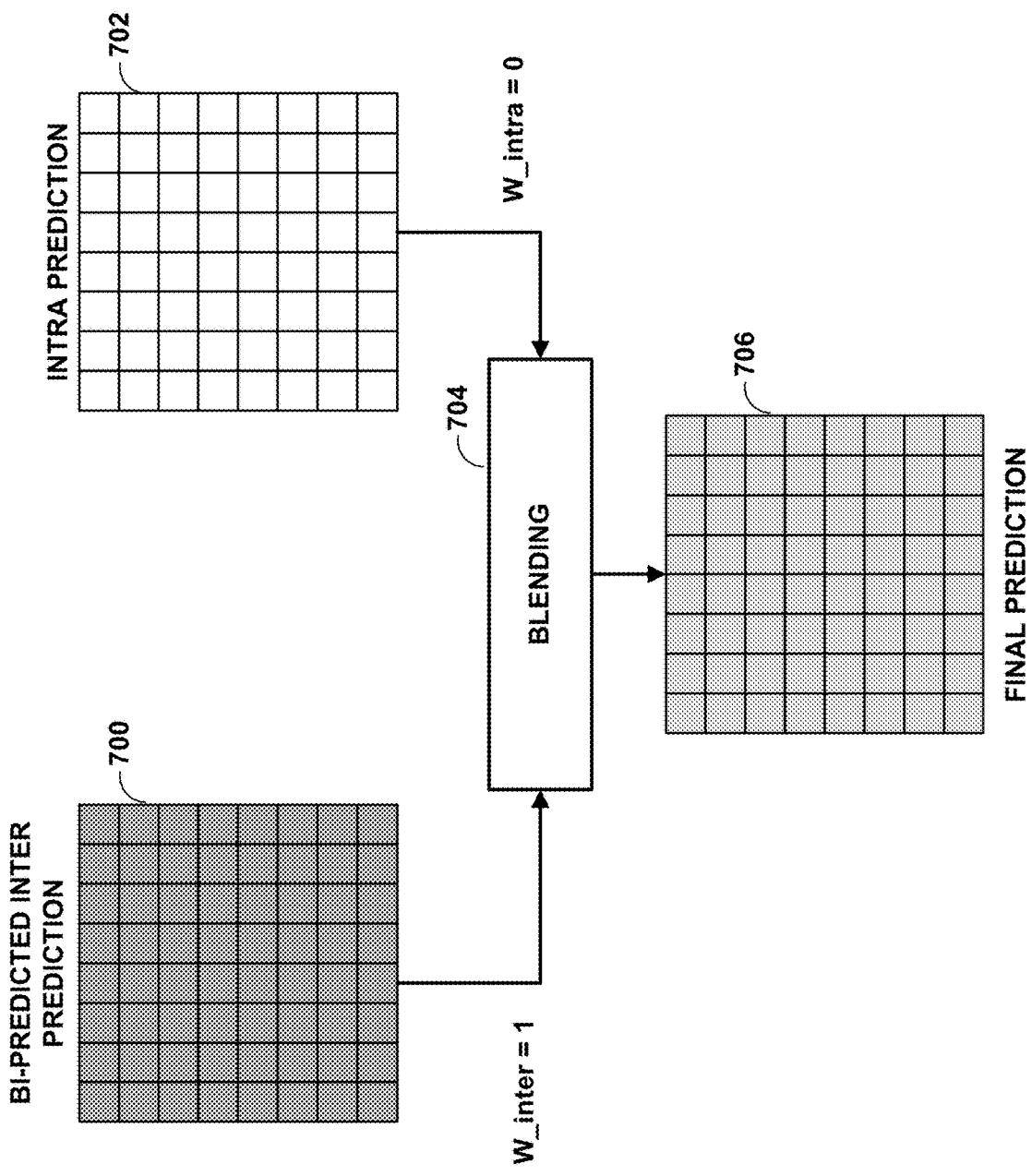
FIG. 10 is a conceptual diagram illustrating an example blending process for inter-intra prediction.

FIG. 10 is a conceptual diagram illustrating this example blending process for inter-intra prediction according to one example of the disclosure. In this example, if the merge indexed block is predicted using bi-prediction, video encoder 200 and video decoder 300 may be configured to set the weight (W_inter) for blending inter samples 700 to 1 and set the weight (W_intra) for blending intra samples 702 to 0. As shown in FIG. 10, inter samples 700 are predicted using bi-predicted inter prediction. Intra samples 702 are predicted using intra prediction. In inter-intra prediction mode, blending unit 704 of video encoder 200 and/or video decoder 300 would blend inter samples 700 with intra samples 702 to produce final prediction samples 706. However, in the example of this disclosure, since W_inter is set to 1 and W_intra is set to 0, intra samples 702 are not needed for inter-intra blending as all of intra samples 702 are weighted to 0. Hence, there is no need for extra buffer for intra prediction in inter-intra blending. If inter samples 700 are not bi-predicted, video encoder 200 and video decoder 300 may determine the inter and intra weights in another manner, such as is described in U.S. patent application Ser. No. 16/684,379.

Figure 11:
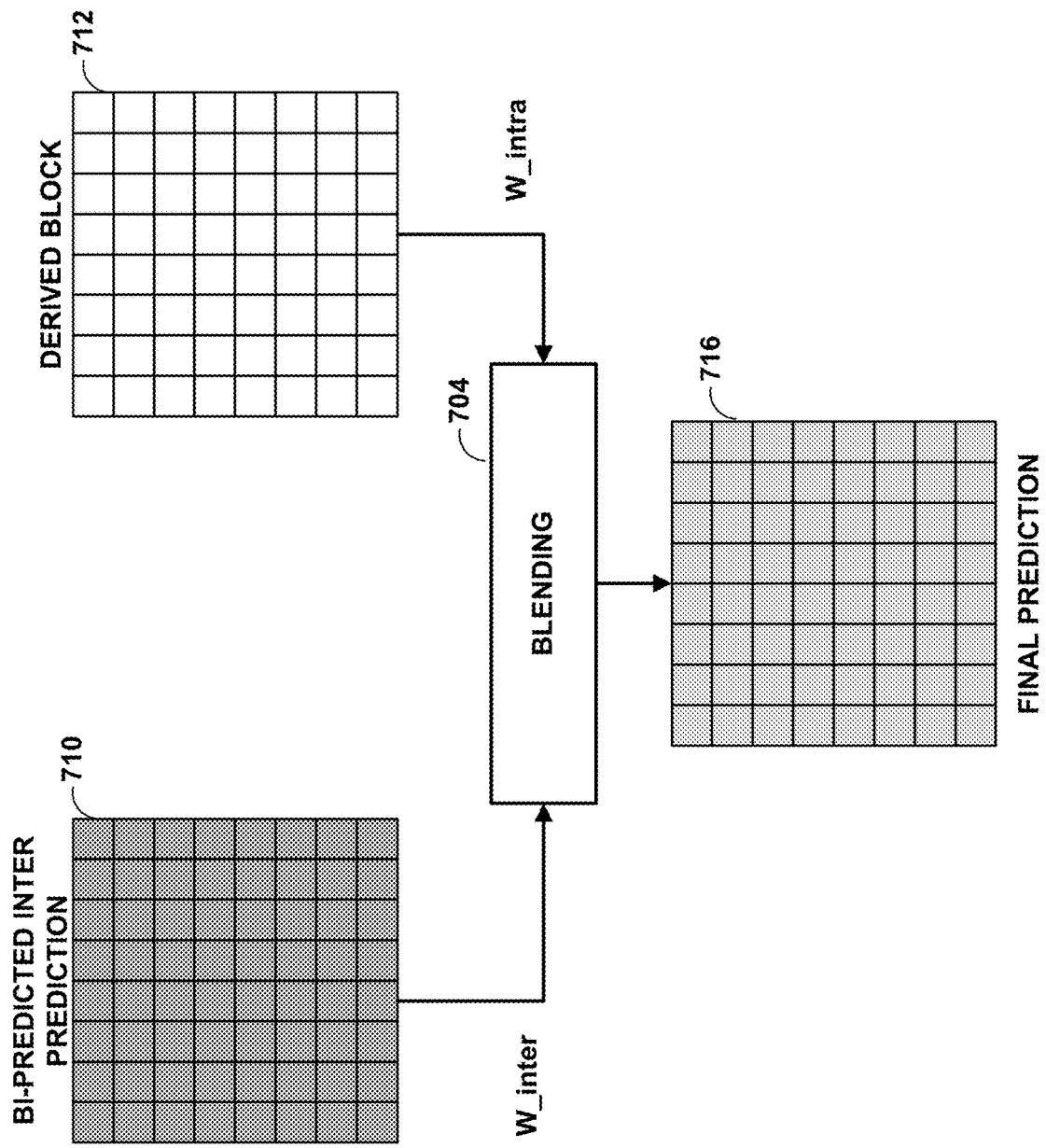
FIG. 11 is a conceptual diagram illustrating an example blending process for inter-intra prediction with a derived block.

FIG. 11 is a conceptual diagram illustrating an example blending process for inter-intra prediction using a derived block. In one example, when the merge indexed block is coded using bi-predicted inter prediction, video encoder 200 and video decoder 300 may be configured to partially disable inter-intra prediction. In this aspect, video encoder 200 and video decoder 300 do not need to generate the intra predicted block. In the blending process, video encoder 200 and video decoder 300 replaces the intra predicted block with a derived block. As such, implementation becomes simpler as an additional buffer for the intra predicted block is not needed. As shown in FIG. 11, video encoder 200 and video decoder 300 may be configured to replace an intra predicted block with a derived block 712 they may approximate the intra predicted block. Accordingly, blending unit 704 of video encoder 200 and/or video decoder 300 would blend inter samples 710 with the samples of derived block 712, using weights W_inter and W_intra, to produce final prediction samples 716. Video encoder 200 and video decoder 300 may directly compute derived block 712 or may the derivation of derived block 712 may be integrated in the inter-intra prediction such that no additional buffer is needed.

ISP Split Type Based on Neighboring Block Intra Prediction Mode

According to aspects of this disclosure, the partitioning (e.g., splitting) of an ISP coding unit using horizontal split or vertical split is based on one or more respective intra prediction modes of one or more neighboring blocks of the ISP CU (e.g., the current block). In one general example, video encoder 200 and video decoder 300 may be configured to determine an intra prediction mode associated with a neighboring block of the current block of video data, and determine a split type of the current block of video data based on the intra prediction mode associated with the neighboring block. Video encoder 200 and video decoder 300 may then split the current block of video data into a plurality of sub-partitions based on the determined split type, and code (e.g., encode or decode) the plurality of sub-partitions. In one example, the current block of video data is an intra sub-partition (ISP) block of video data, video encoder 200 and video decoder 300 may code the plurality of sub-partitions using intra prediction.

In this example, there may no longer be a need for video encoder 200 to evaluate for both horizontal split or vertical split when determining how to partition an ISP CU. As such, the value of a flag that indicates the split type (e.g., horizontal split of vertical split) is implicit. As such, video encoder 200 may refrain from signaling any syntax elements (e.g., a flag) that indicate the split type in the bitstream. That is, according to one example of this disclosure, video encoder 200 may not encode or signal a flag that indicates the split type. Accordingly, video decoder 300 may not receive or decode a flag for the split type. Instead, video decoder 300 implicitly determines the split type from the intra prediction mode of a neighboring block. In this way, coding a split type flag may be avoided, thus reducing signaling overhead and increasing coding efficiency.

Figure 12B:
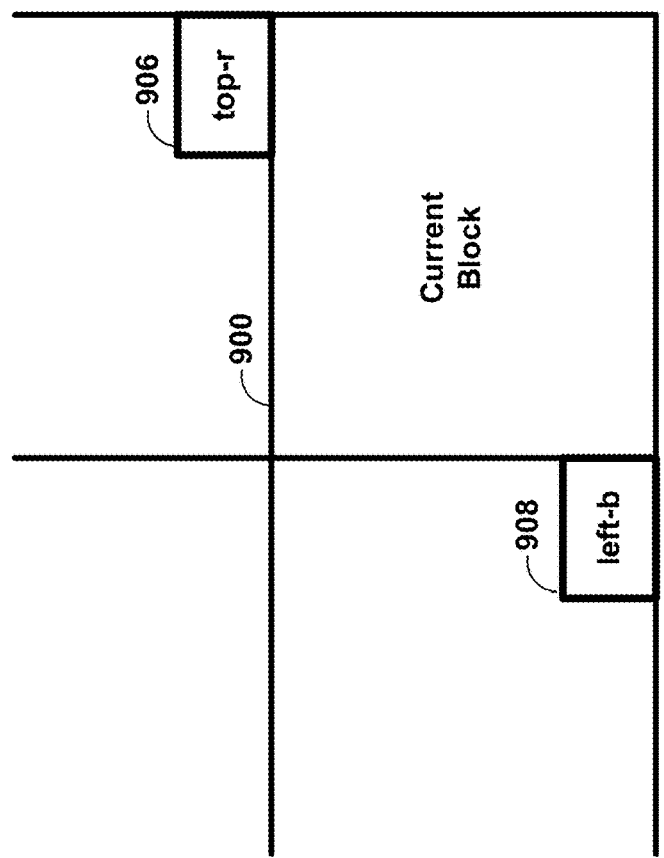
FIGS. 12A and 12B are conceptual diagrams illustrating neighboring blocks used for split type determination according to the techniques of this disclosure.
Figure 12A:
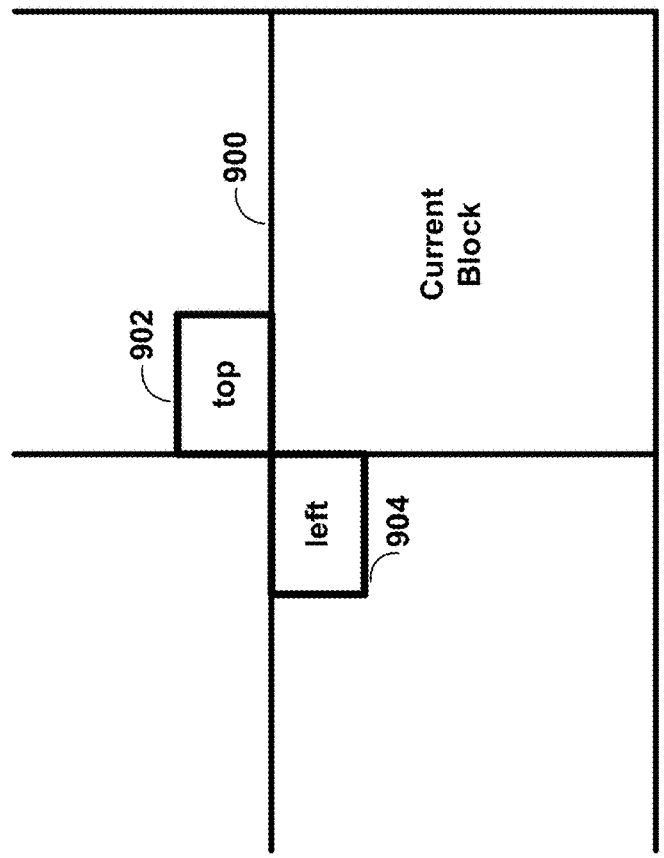

FIGS. 12A and 12B are conceptual diagrams illustrating neighboring blocks used for split type determination according to the techniques of this disclosure. In the example of FIG. 12A, video encoder 200 and video decoder 300 may use the intra prediction mode of top block 902 or left block 904 to determine the split type of current block 900. In the example of FIG. 12B, video encoder 200 and video decoder 300 may use the intra prediction mode of top-right (top-r) block 906 or left-bottom (left-b) block 908 to determine the split type of current block 900. Or more generally, video encoder 200 and video decoder 300 may be configured to use the intra prediction mode of any neighboring block that is above or to the left of a current block.

In another example, video encoder 200 and video decoder 300 may be configured to use the first prediction mode in a most probable modes (MPM) list to determine the split type of the current CU.

Described more generally, in some examples, video encoder 200 and video decoder 300 may be configured to choose a neighboring block 'B' that is used to determining the split type of the current CU. As discussed above, the neighboring block 'B' may be one of a left block, a top block, a left-bottom block, or a top-right block relative to the current block of video data. Video encoder 200 and video decoder 300 may then determine an intra prediction mode (M) that is associated with the neighboring block. In some examples, the mode M may be the intra prediction mode used to code the neighboring block. In other examples, the mode M may be derived from a mode used to code the neighboring block. For example, if the coding mode of the reference block B is non-intra (e.g., inter, intra block copy, or palette mode), video encoder 200 and video decoder 300 may be configured to determine mode M as planar mode.

After the reference intra prediction mode (M) is determined, video encoder 200 and video decoder 300 may be configured to determine the split type of the current CU. The prediction mode M may be classified as likely vertical or likely horizontal based on the prediction mode index (e.g., see FIG. 8). For example, if M is in the prediction mode index range from 2 to 34 or from 67 to 80, such a mode may be classified as likely horizontal. In also another example, if M is in the prediction mode index range from 35 to 66 or from −14 to −1, such a mode may be classified as likely vertical. Based on the classification of intra prediction mode M, video encoder 200 and video decoder 300 may be configured to determine split type for the ISP mode coded current block as follows.

In one example, if the intra prediction mode M is angular and likely vertical, video encoder 200 and video decoder 300 may determine that the current block (e.g., CU) is split using a vertical split. In another example, if the intra prediction mode M is angular and likely vertical, video encoder 200 and video decoder 300 may determine that the current block is split using a horizontal split. In another example, if the intra prediction mode M is angular and likely horizontal, video encoder 200 and video decoder 300 may determine that the current block is split using a vertical split. In another example, if the intra prediction mode M is angular and likely horizontal, video encoder 200 and video decoder 300 may determine that the current block is split using a horizontal split.

In another example, if the intra prediction mode is not angular (e.g., if the intra prediction mode is a DC mode or a planar mode), video encoder 200 and video decoder 300 may determine that the current block is split using a default split. In this example, the default split can be either a horizontal split or a vertical split.

In another example, if the intra prediction mode is angular and likely horizontal, video encoder 200 may be configured to test both horizontal and vertical split modes to select the best split type to use for the current block. In this example, video encoder 200 may signal a flag to video decoder 300 to indicate the split mode.

In other examples of this disclosure, video encoder 200 and video decoder 300 may be configured to use respective intra prediction modes associated with more than one neighboring block to determine a split type of the current block (e.g., current CU). The determination of the split type may involve one or more of the following aspects of splitting.

In one example, video encoder 200 and video decoder 300 may be configured to determine a number and position of a plurality of split candidates that are used to determine the split type for the current block. In this context, a split candidate may refer to a neighboring block at a particular position relative to the current block. For example, the neighboring blocks may include two or more of a left block, a top block, a left-bottom block, or a top-right block relative to the current block of video data. Of course, other positions of neighboring blocks may be used. In some examples, video encoder 200 and video decoder 300 may adaptively determine the split candidates on a block-by-block basis. In other examples, the number and positions of split candidates may be predetermined.

In a further example of the disclosure, video encoder 200 and video decoder 300 may be configured to determine an order of preference for the split candidates. For example, video encoder 200 may use the order of preference to determine a subset of split candidates to be tested, or may use the order of preference to define a list of split candidates. Video encoder 200 may signal an index to the split candidate list to video decoder 300 to indicate the particular split decision to be used for the current CU. For example, video encoder 200 may be configured to encode an index that indicates a split candidate from among a plurality of split candidates, wherein the plurality of split candidates include the respective intra prediction modes associated with a plurality of neighboring blocks. Video decoder 300 may be configured to decode the index, and determine the split type of the current block of video data based on the respective intra prediction mode associated with the indicated split candidate.

In a further example, video encoder 200 and video decoder 300 may be configured to determine a context used to entropy code a split flag or bins of the index that indicate the split candidates. For example, when the intra modes of two neighbouring blocks are horizontal, video encoder 200 and video decoder 300 may be configured to use one context for the split flag or bins of the index that indicate the split candidates. When the reference intra modes of two neighboring blocks are vertical, video encoder 200 and video decoder 300 may be configured to use another context for the split flag. When the reference intra modes of two neighbouring blocks are vertical and horizontal, another context may be used for the split flag or bins of the index that indicate the split candidates. In other examples, determination of a context may also be dependent on other characteristics of the modes used for the neighboring blocks such as PL (planar), DC, angular modes, wide angle modes, etc.

In other examples of this disclosure, the determination of a split type may be made by considering one or more intra modes of neighboring blocks, and one or more modes by which the neighboring blocks are coded (e.g. whether the neighboring block is coded with an inter-intra mode).

In other examples of this disclosure, some of the decisions described above may be restricted to certain processing orders. For instance, the dependence on neighboring intra modes may only apply when the processing order is not the reversed order. In such cases, the decisions may also be determined on the particular intra modes used.

Figure 13:
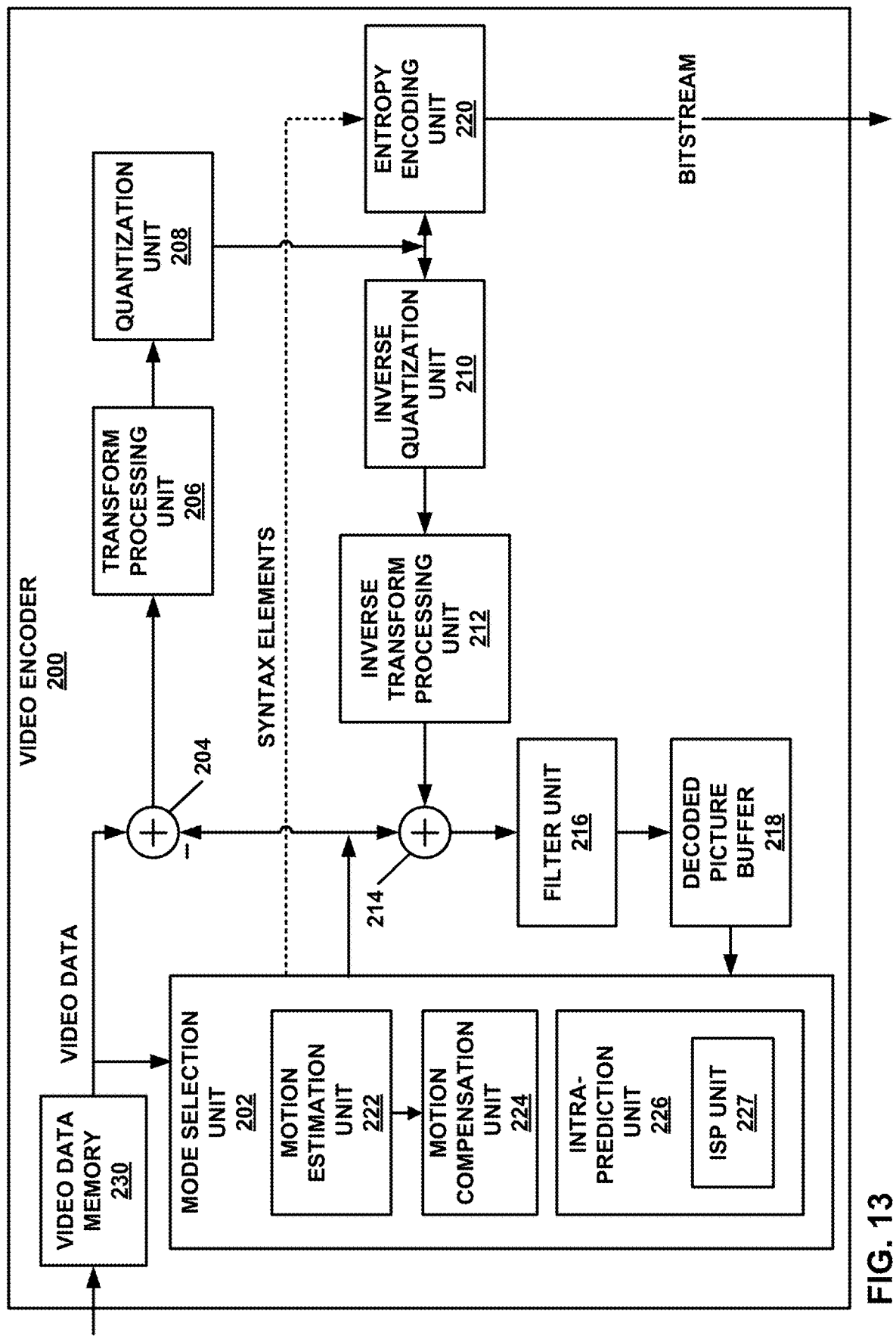
FIG. 13 is a block diagram illustrating an example video encoder that may implement one or more techniques described in this disclosure.

FIG. 13 is a block diagram illustrating an example video encoder 200 that may perform the techniques of this disclosure. FIG. 13 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 13, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions. Non-limiting examples of processing circuitry that video encoder 200 may include are fixed function circuitry, programmable circuitry, and ASICs.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 13 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

The units of video encoder 200 described below may be implemented as one or more circuits or logic elements as part of hardware circuitry, or as part of a processor, ASIC, of FPGA. Moreover, video encoder 200 may include additional or alternative processors or processing circuitry to perform these and other functions. For instance, video encoder 200 includes integrated circuitry, and the various units illustrated in FIG. 13 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric circuit components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 13 may be software units executing on the processing circuitry. In such examples, the object code for these software units is stored in memory. An operating system may cause video encoder 200 to retrieve the object code and execute the object code, which causes video encoder 200 to perform operations to implement the example techniques. In some examples, the software units may be firmware that video encoder 200 executes at startup. Accordingly, video encoder 200 is a structural component having hardware that performs the example techniques or has software and/or firmware executing on the hardware to specialize the hardware to perform the example techniques.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Intra-prediction unit 226 may include intra sub-partition (ISP) unit 227 that may be configured to encode video data according to an ISP coding, as is described above. In addition, ISP unit 227 may be configured to perform any combination of techniques of the disclosure described above. For example, ISP unit 227 may be configured to determine an intra prediction mode associated with a neighboring block of the current block of video data, determine a split type of the current block of video data based on the intra prediction mode associated with the neighboring block, split the current block of video data into a plurality of sub-partitions based on the determined split type, and encode the plurality of sub-partitions.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and LM mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a DCT, a directional transform, a KLT, or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a MV and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Figure 14:
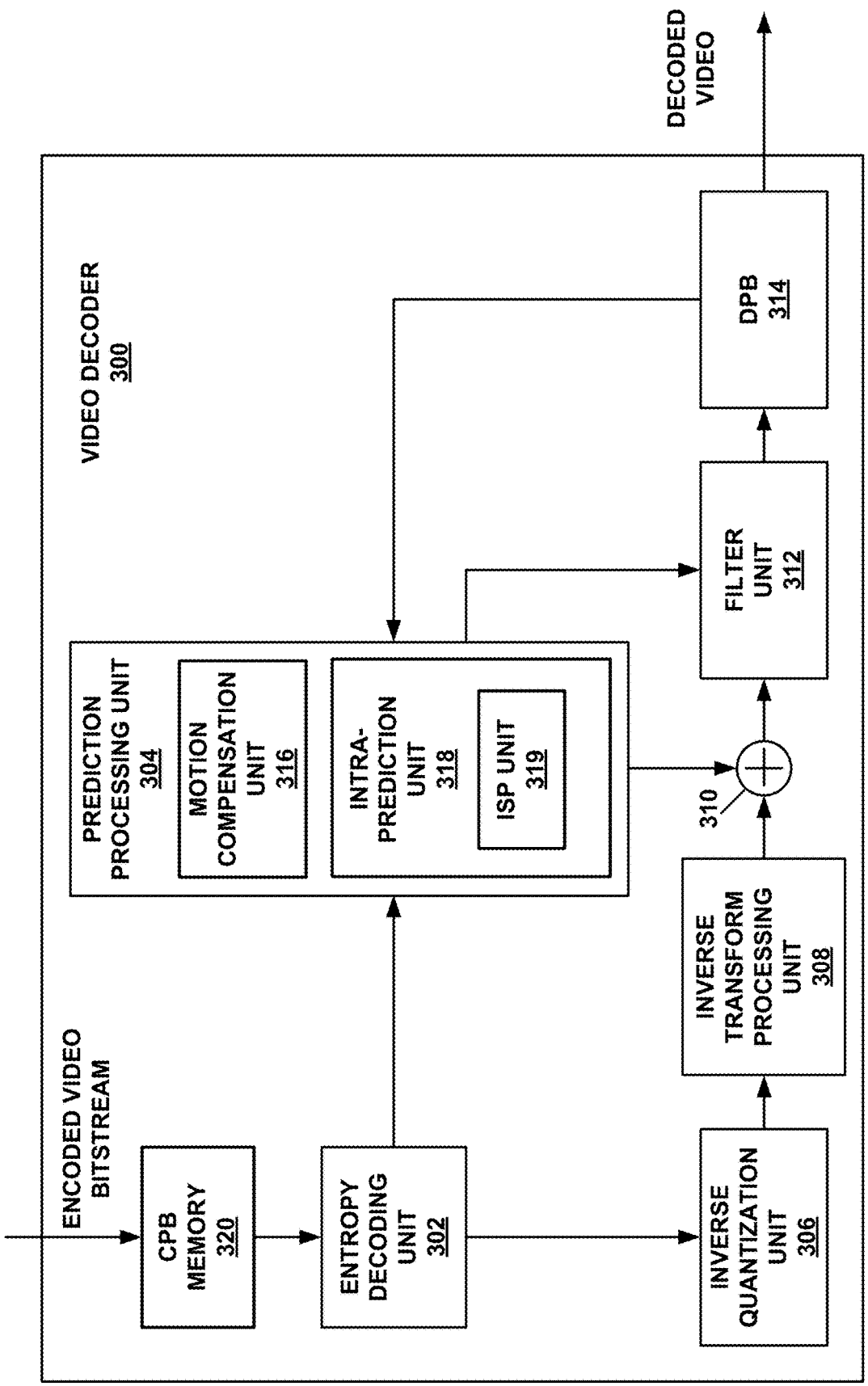
FIG. 14 is a block diagram illustrating an example video decoder that may implement one or more techniques described in this disclosure.

FIG. 14 is a block diagram illustrating an example video decoder 300 that may perform the techniques of this disclosure. FIG. 14 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 14, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions. Non-limiting examples of processing circuitry that video decoder 300 may include are fixed function circuitry, programmable circuitry, and ASICs.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a LM unit, or the like. In other examples, video decoder 300 may include more, fewer, or different functional components.

Intra-prediction unit 318 may include ISP unit 319 that may be configured to encode video data according to an ISP coding, as is described above. In addition, ISP unit 319 may be configured to perform any combination of techniques of the disclosure described above. For example, ISP unit 319 may be configured to determine an intra prediction mode associated with a neighboring block of the current block of video data, determine a split type of the current block of video data based on the intra prediction mode associated with the neighboring block, split the current block of video data into a plurality of sub-partitions based on the determined split type, and decode the plurality of sub-partitions.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 14 are illustrated to assist with understanding the operations performed by video decoder 300. The units may be implemented as fixed-function circuits, programmable circuits, or a combination thereof. Similar to FIG. 13, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

The units of video decoder 300 described below may be implemented as one or more circuits or logic elements as part of hardware circuitry, or as part of a processor, ASIC, of FPGA. Moreover, video decoder 300 may include additional or alternative processors or processing circuitry to perform these and other functions. For instance, video decoder 300 includes integrated circuitry, and the various units illustrated in FIG. 14 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric circuit components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 14 may be software units executing on the processing circuitry. In such examples, the object code for these software units is stored in memory. An operating system may cause video decoder 300 to retrieve the object code and execute the object code, which causes video decoder 300 to perform operations to implement the example techniques. In some examples, the software units may be firmware that video encoder 200 executes at startup. Accordingly, video decoder 300 is a structural component having hardware that performs the example techniques or has software and/or firmware executing on the hardware to specialize the hardware to perform the example techniques.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a QP and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse KLT, an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 13).

Figure 15:
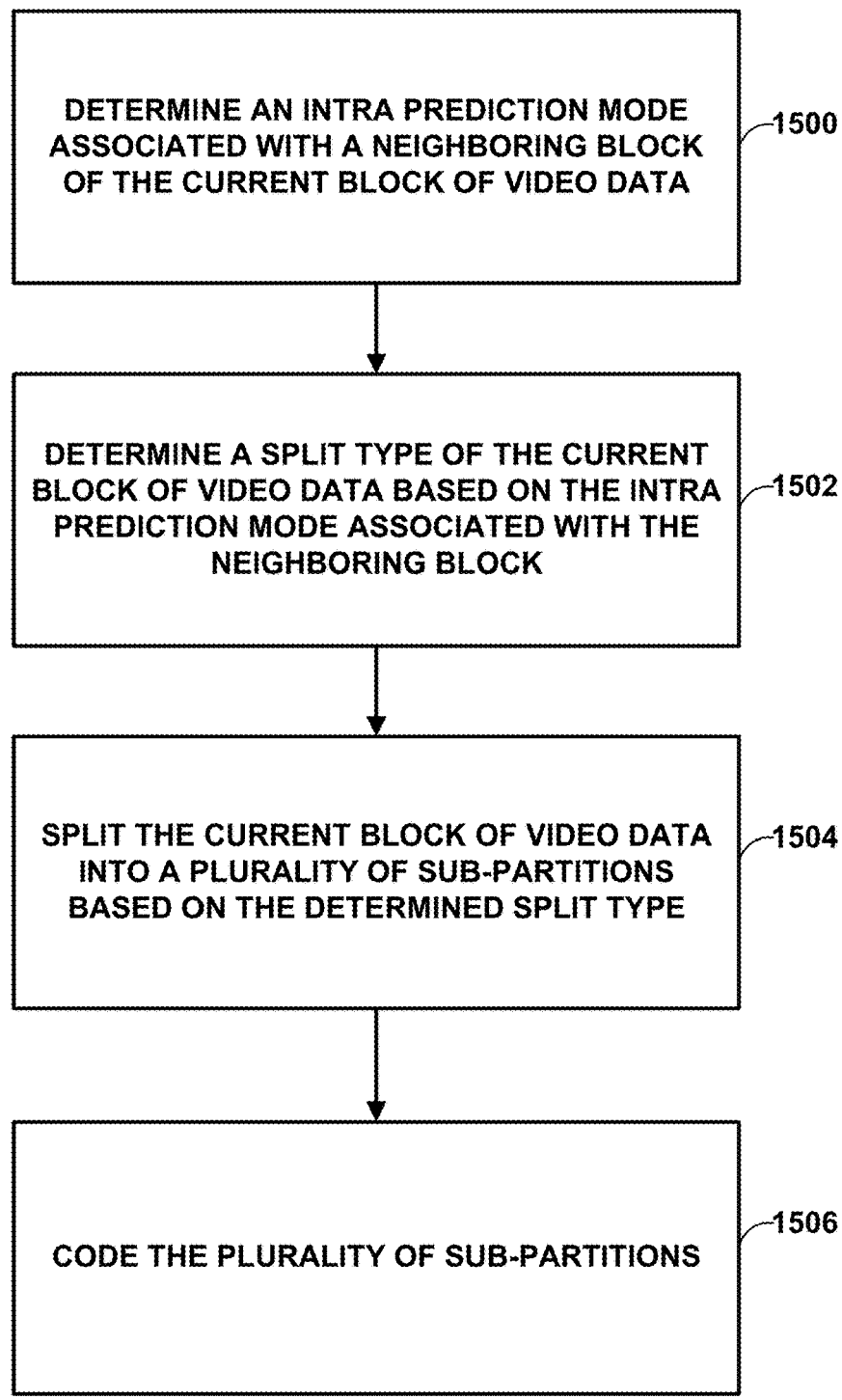
FIG. 15 is a flowchart illustrating an example coding method of the disclosure.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 15). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a device for decoding video data including a memory configured to store video data, and one or more processing units implemented in processing circuitry and configured to perform example techniques described in this disclosure.

FIG. 15 is a flowchart showing an example coding method of the disclosure. The techniques of FIG. 15 may be performed by video encoder 200 and video decoder 300, including ISP unit 227 (FIG. 13) and ISP unit 319 (FIG. 14).

In one example of the disclosure, video encoder 200 and video decoder 300 may be configured to determine an intra prediction mode associated with a neighboring block of the current block of video data (1500), determine a split type of the current block of video data based on the intra prediction mode associated with the neighboring block (1502), split the current block of video data into a plurality of sub-partitions based on the determined split type (1504), and code the plurality of sub-partitions (1506).

In one example, the current block of video data is an intra sub-partition (ISP) block of video data, and wherein to code the plurality of sub-partitions, video encoder 200 and video decoder 300 are further configured to code the plurality of sub-partitions using intra prediction.

In another example of the disclosure, the neighboring block is one of a left block, a top block, a left-bottom block, or a top-right block relative to the current block of video data.

In another example of the disclosure, to determine the split type of the current block of video data based on the intra prediction mode associated with the neighboring block, video encoder 200 and video decoder 300 are further configured to determine a vertical split type when the intra prediction mode is angular and vertical.

In another example of the disclosure, to determine the split type of the current block of video data based on the intra prediction mode associated with the neighboring block, video encoder 200 and video decoder 300 are further configured to determine a horizontal split type when the intra prediction mode is angular and vertical.

In another example of the disclosure, to determine the split type of the current block of video data based on the intra prediction mode associated with the neighboring block, video encoder 200 and video decoder 300 are further configured to determine a vertical split type when the intra prediction mode is angular and horizontal.

In another example of the disclosure, to determine the split type of the current block of video data based on the intra prediction mode associated with the neighboring block, video encoder 200 and video decoder 300 are further configured to determine a horizontal split type when the intra prediction mode is angular and horizontal.

In another example of the disclosure, to determine the split type of the current block of video data based on the intra prediction mode associated with the neighboring block, video encoder 200 and video decoder 300 are further configured to determine a default split type when the intra prediction mode is not angular.

In another example of the disclosure, to determine the split type of the current block of video data based on the intra prediction mode associated with the neighboring block, video encoder 200 and video decoder 300 are further configured to determine the split type of the current block of video data based on the intra prediction mode associated with the neighboring block without coding a syntax element that indicates the split type.

In another example of the disclosure, to determine the split type of the current block of video data based on the intra prediction mode associated with the neighboring block, video encoder 200 and video decoder 300 are further configured to determine the split type of the current block of video data based on respective intra prediction modes associated with a plurality of neighboring blocks.

In another example of the disclosure, video encoder 200 and video decoder 300 are further configured to code an index that indicates a split candidate from among a plurality of split candidates, wherein the plurality of split candidates include the respective intra prediction modes associated with the plurality of neighboring blocks, and determine the split type of the current block of video data based on the respective intra prediction mode associated with the indicated split candidate.

In another example of the disclosure, video encoder 200 and video decoder 300 are further configured to determine a context for coding the index based on an order of preference of the plurality of split candidates, and code the index using the context.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor," "processing circuitry," or "circuit" as used herein may refer to any of the foregoing structures or any other structure suitable for implementation of the techniques described herein, and may be used inter-changeably where appropriate. In addition, in some aspects, the functionality described herein may be provided within dedicated hardware and/or software circuits configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to code video data, the apparatus comprising:
 a memory configured to store a current block of video data; and
 one or more processors, implemented in circuitry, and in communication with the memory, the one or more processors configured to:
  determine an intra prediction mode associated with a neighboring block of the current block of video data;
  determine a split type of the current block of video data based on the intra prediction mode associated with the neighboring block without coding a syntax element that indicates the split type, wherein to determine the split type of the current block of video data based on the intra prediction mode associated with the neighboring block, the one or more processors are further configured to determine a horizontal split type when the intra prediction mode associated with a neighboring block is a DC mode or a planar mode;
  split the current block of video data into a plurality of sub-partitions based on the split type; and
  code the plurality of sub-partitions using intra prediction.

2. The apparatus of claim 1, wherein the neighboring block is one of a left block, a top block, a left-bottom block, or a top-right block relative to the current block of video data.

3. The apparatus of claim 1, wherein the one or more processors are further configured to:
 determine a vertical split type for the current block when the intra prediction mode is vertical.

4. The apparatus of claim 1, wherein the one or more processors are further configured to:
 determine the horizontal split type for the current block when the intra prediction mode is vertical.

5. The apparatus of claim 1, wherein the one or more processors are further configured to:
 determine a vertical split type for the current block when the intra prediction mode is horizontal.

6. The apparatus of claim 1, wherein the one or more processors are further configured to:
   determine the horizontal split type for the current block when the intra prediction mode is horizontal.

7. The apparatus of claim 1, wherein to code the plurality of sub-partitions, the one or more processors are further configured to decode the plurality of sub-partitions, the apparatus further comprising:
   a display configured to display a picture that includes the decoded sub-partitions.

8. The apparatus of claim 1, wherein to code the plurality of sub-partitions, the one or more processors are further configured to encode the plurality of sub-partitions, the apparatus further comprising:
   a camera configured to capture a picture that includes the current block of video data.

9. A method of coding video data, the method comprising:
   determining an intra prediction mode associated with a neighboring block of a current block of video data;
   determining a split type of the current block of video data based on the intra prediction mode associated with the neighboring block without coding a syntax element that indicates the split type, wherein to determine the split type of the current block of video data based on the intra prediction mode associated with the neighboring block, the one or more processors are further configured to determine a horizontal split type when the intra prediction mode associated with a neighboring block is a DC mode or a planar mode;
   splitting the current block of video data into a plurality of sub-partitions based on the split type; and
   coding the plurality of sub-partitions using intra prediction.

10. The method of claim 9, wherein the neighboring block is one of a left block, a top block, a left-bottom block, or a top-right block relative to the current block of video data.

11. The method of claim 9, further comprising:
    determining a vertical split type for the current block when the intra prediction mode is vertical.

12. The method of claim 9, further comprising:
    determining the horizontal split type for the current block when the intra prediction mode is vertical.

13. The method of claim 9, further comprising:
    determining a vertical split type for the current block when the intra prediction mode is horizontal.

14. The method of claim 9, further comprising:
    determining the horizontal split type for the current block when the intra prediction mode is horizontal.

15. The method of claim 9, wherein coding the plurality of sub-partitions comprises decoding the plurality of sub-partitions, the method further comprising:
    displaying a picture that includes the decoded sub-partitions.

16. The method of claim 9, wherein coding the plurality of sub-partitions comprises encoding the plurality of sub-partitions, the method further comprising:
    capturing a picture that includes the current block of video data.

17. A non-transitory computer-readable storage medium storing instructions that, when executed, cause one or more processors of a device configured to code video data to:
    determine an intra prediction mode associated with a neighboring block of the current block of video data;
    determine a split type of the current block of video data based on the intra prediction mode associated with the neighboring block without coding a syntax element that indicates the split type, wherein to determine the split type of the current block of video data based on the intra prediction mode associated with the neighboring block, the one or more processors are further configured to determine a horizontal split type when the intra prediction mode associated with a neighboring block is a DC mode or a planar mode;
    split the current block of video data into a plurality of sub-partitions based on the split type; and
    code the plurality of sub-partitions using intra prediction.

* * * * *